US005725636A

United States Patent [19]
Gavlin et al.

[11] Patent Number: 5,725,636
[45] Date of Patent: *Mar. 10, 1998

[54] GAS DEHYDRATION PROCESS

[75] Inventors: Gilbert Gavlin, Lincolnwood; Boris Goltsin, Skokie, both of Ill.

[73] Assignee: Gas Research Institute, Chicago, Ill.

[ * ] Notice: The term of this patent shall not extend beyond the expiration date of Pat. No. 5,462,584.

[21] Appl. No.: 722,862

[22] Filed: Sep. 26, 1996

Related U.S. Application Data

[60] Division of Ser. No. 585,636, Jan. 16, 1996, which is a continuation-in-part of Ser. No. 215,757, Mar. 21, 1994, abandoned.

[51] Int. Cl.$^6$ .................................................. B01D 19/00
[52] U.S. Cl. .................................................. 95/231; 55/220
[58] Field of Search ........................... 55/220; 95/156, 95/178, 184, 231, 239, 149

[56] References Cited

U.S. PATENT DOCUMENTS

| | | |
|---|---|---|
| 1,866,560 | 7/1932 | Gordon et al. . |
| 2,235,322 | 3/1941 | Martin . |
| 2,394,758 | 2/1946 | Edmunds . |
| 2,988,171 | 6/1961 | Arnold et al. . |
| 4,979,965 | 12/1990 | Sannholm . |
| 5,167,675 | 12/1992 | Rhodes . |
| 5,346,537 | 9/1994 | Lowell . |
| 5,462,584 | 10/1995 | Gavlin et al. . |

FOREIGN PATENT DOCUMENTS

| | | |
|---|---|---|
| 595128 | 11/1947 | United Kingdom . |

OTHER PUBLICATIONS

Arthur L. Kohl and Fred C. Riesenfeld, "Gas Purification", Fourth Edition, Gulf Publishing Company, Chapter 11.
R.L. Pearce and C. Richard Sivalls, "Fundamentals of Gas Dehydration Design and Operation with Glycol Solutions", 1984.

*Primary Examiner*—C. Scott Bushey
*Attorney, Agent, or Firm*—Speckman Pauley Petersen & Fejer

[57] ABSTRACT

A process for dehydrating gaseous fluids, such as natural gas, in which the gaseous fluid is contacted with a substantially anhydrous composition having a glycol and an aromatics solubility depressant. The glycol is preferably ethylene glycol, diethylene glycol, triethylene glycol, and mixtures thereof.

22 Claims, No Drawings

GAS DEHYDRATION PROCESS

This is a divisional application of copending U.S. patent application having Ser. No. 08/585,636 filed on 16 Jan. 1996, which application is a continuation-in-part of U.S. patent application Ser. No. 08/215,757, filed 21 Mar. 1994 now abandoned.

BACKGROUND OF THE INVENTION

1. Field of the Invention

This invention relates to a process for removal of water from gases. More particularly, this invention relates to a process for the removal of water from natural gas utilizing a drying agent whereby the rate of aromatic compound absorption by the drying agent is reduced.

2. Description of Prior Art

Many gases, such as air, nitrogen and natural gas, contain water vapor in varying amounts depending upon the pressure and temperature of the gases. This water vapor can result in corrosion of and stoppages in valves and fittings in gas transmission systems, including the formation of ice or hydrates where the gas may be compressed or cooled. In order to prevent these potentially serious consequences, numerous processes have been developed for reducing or substantially eliminating the water vapor from said gases. See for example Kohl et al., "Gas Purification" 4th Edition, 1985, Gulf Publishing Company which provides a detailed summary of the problem of water vapor in natural gas and various means which have been developed for removing said water.

There are currently at least three known commercial methods for removing water vapor from gases: absorption by hygroscopic liquids; adsorption by activated solid desiccants; and condensation by compression and/or cooling.

Of these methods, the most prominent method currently in use is absorption by hygroscopic liquids and, in particular, liquid glycols having between two and eight carbon atoms. Such liquids are exemplified by ethylene glycol and polyglycols such as diethylene glycol and triethylene glycol, and blends of such compositions. These glycols are known to have unusual hygroscopicity, reasonably good stability with respect to heat and chemical decomposition, and relatively low vapor pressure.

In a typical glycol dehydration plant, a glycol stream containing about 1–5% water by weight is contacted with natural gas in a counter-current column. During the counter-current contact, the glycol stream removes water from the natural gas stream and the dilute glycol stream is passed to a reconcentration or regeneration process in which the absorbed water is removed, thereby enabling reuse of the glycol. Due to the high temperatures that may be involved in the reconcentration or regeneration process, triethylene glycol is sometimes preferred as the dehydration agent due to its greater thermal stability.

One problem with known processes for dehydration of natural gas is the undesirable tendency of the drying agent to absorb aromatic compounds which may be present in the natural gas.

SUMMARY OF THE INVENTION

Accordingly, it is an object of this invention to provide a process for removal of water from gases having improved efficiency over known processes.

It is another object of this invention to provide a process for removal of water from natural gas.

It is yet another object of this invention to provide a process for removal of water from gases whereby the rate of aromatic compound absorption by the drying agent is substantially reduced over known processes.

These and other objects of this invention are achieved by a process for removal of water from a gaseous fluid comprising contacting the gaseous fluid with a substantially anhydrous composition comprising a glycol and a dissolved salt comprising at least one potassium carboxylate and comprising up to about 33% by weight of the substantially anhydrous composition. The glycol is selected from the group consisting of ethylene glycol, diethylene glycol, triethylene glycol, and mixtures thereof.

The process of this invention improves the capacity of glycols to absorb moisture in a gas drying or dehydration process by use of a salt preferably selected from the group consisting of potassium acetate and potassium formate. We have found that the addition of potassium acetate or potassium formate to a glycol can increase the capacity of the glycol to absorb water from a gas stream by up to three times or more, depending upon the amount of salt added and the particular glycol utilized.

We have also found that the potassium acetate and potassium formate salts not only increase the basic hygroscopicity of the glycols, but their presence also markedly reduces the solubility of the glycols for aromatic compounds normally found, for example, in natural gas. Such aromatic compounds as benzene, toluene, ethylbenzene, and xylene are frequently present in natural gas and are normally extracted and absorbed by glycols alone, thereby reducing their capacity to remove water from the gas stream. In addition, the presence of aromatic compounds, which may comprise 10–40% of the dehydrating composition, not only contaminates the glycols, but also complicates their reconcentration and introduces costly environmental problems related to disposition of the aromatics. We have found that the further addition of certain neutral organic additives to the substantially anhydrous composition further decreases the rate of absorption of aromatics. Indeed, the decrease in absorption of aromatic compounds from the gaseous fluids being dehydrated is unexpectedly greater than would be expected based upon the decrease in aromatic absorption resulting from the use of potassium carboxylates or such neutral additives alone.

DESCRIPTION OF PREFERRED EMBODIMENTS

We have found that the three principal glycols normally contemplated for use in drying gaseous fluids, such as natural gas, even in an anhydrous state, have the ability to dissolve substantial mounts of potassium carboxylates which, in turn, increases the capacity of the glycols to absorb water. Tables I and II hereinbelow show the solubilities in glycols at 30° C. of potassium acetate and potassium formate, respectively. From this data, it can been seen that the solubility of potassium acetate and potassium formate in anhydrous ethylene glycol and anhydrous diethylene glycol is comparable. However, potassium formate is substantially more soluble in anhydrous triethylene glycol than potassium acetate and, thus, potassium formate is the preferred dissolved salt, particularly when triethylene glycol, which has been the preferred glycol for drying natural gas due primarily to its thermal stability on reconcentration or regeneration, is used.

TABLE I

| POTASSIUM ACETATE SOLUBILITY IN GLYCOLS (30° C.) | |
|---|---|
| Glycol | wt. % |
| anhydrous ethylene glycol | 40 |
| anhydrous diethylene glycol | 35 |
| anhydrous triethylene glycol | 4 |

TABLE II

| POTASSIUM FORMATE SOLUBILITY IN GLYCOLS (30° C.) | |
|---|---|
| Glycol | wt. % |
| anhydrous ethylene glycol | 40 |
| anhydrous diethylene glycol | 25 |
| anhydrous triethylene glycol | 21 |

It will be apparent to those skilled in the art that, for each particular gas stream analysis, an optimum combination of potassium salt and glycol can be predetermined and prepared for introduction into a counter-current dehydration or staged system. In accordance with one preferred embodiment of the process of the invention, it is preferred that the amount of dissolved salt in the substantially anhydrous composition is less than about 33% by weight of said substantially anhydrous composition. In accordance with a particularly preferred embodiment of this invention, based upon the data shown in Tables I and II, the preferred dissolved salt is potassium formate in an amount comprising in the range of about 10% to 21% by weight of the substantially anhydrous composition. Potassium formate, in particular, imparts an increased capacity to the substantially anhydrous glycol composition to absorb water and at the same time diminishes the ability of the solution to absorb aromatic compounds, such as benzene, as shown hereinbelow.

A typical counter-current system for dehydration of natural gas is taught by the Kohl et al. reference. However, it will be apparent to those skilled in the art that such a counter-current system could be used for drying other gases as well. Due to losses which may occur, monitoring of the concentrations and corresponding continuous additions may be necessary.

In most counter-current gas dehydration systems, the dehydration solvent composition is introduced at the top of a vertical dehydration column and withdrawn at the bottom of the column. Correspondingly, the water-containing gas is introduced at the bottom of the vertical dehydration column and removed at the top, thus passing upwardly through the descending dehydration solvent composition. Alternately, for specific purposes, a gas can be dehydrated by passing it through one or more stages containing a dehydrating solvent composition, such as disclosed by U.S. Pat. No. 4,979,965.

The temperature and pressure of the gas to be dehydrated can have an effect on the process of this invention. For example, for natural gas containing primarily methane, the temperature of the gas to be dehydrated will usually be within the range of about 85°-105° F., having been reduced from higher temperatures when discharged from its underground source. Pressure during dehydration is usually increased to between about 500-1,000 psi. At this temperature, the gas will contain about 1.5 to 5% by weight of water.

The following examples show the results of laboratory dehydration experiments, and illustrate the principles of the process of this invention, on air and methane, utilizing potassium acetate and potassium formate with diethylene glycol (DEG) compared to the use of triethylene glycol (TEG) alone, as the current industry standard dehydrating agent. In these examples, the test gases were initially saturated with water at 21° C. to avoid condensation in the lines when processed at 30° C. (86° F.). After saturation, the gases were passed through the respective solutions at atmospheric pressure, and the effluent analyzed. In selected instances, a second stage was utilized, but was found to have minimal, or insignificant, effect on dehydration. Table III shows the dehydration results obtained with air and Table IV shows the dehydration results obtained with methane. In each case, the molar water content of air and methane were the same. The water weight percent difference is due to the difference in the respective molecular weights of air versus methane, that is 29 versus 16.

TABLE III

Dehydration of Saturated Air (1.5 wt. %)

| | | | Initial Water Content of Solvent (wt. %) | | | |
|---|---|---|---|---|---|---|
| | | | 1 | 3 | 5 | 10 |
| Ex | Solvent | Solvent Temp. °F. | Water Content of Dehydrated Air (wt. %) | | | |
| 1 | TEG | 86 | 0.3 | 0.42 | 0.65 | 0.85 |
| 2 | | 104 | 0.3 | 0.8 | 1.0 | 1.5 |
| 3 | 30% K Ac-DEG | 86 | 0 | 0.23 | 0.33 | 0.48 |
| 4 | | 104 | 0 | 0.3 | 0.60 | 1.0 |
| 5 | 25% K Form-DEG | 86 | 0.2 | 0.25 | 0.35 | 0.5 |
| 6 | | 104 | 0.3 | 0.50 | 0.60 | 1.0 |

TABLE IV

Dehydration of Saturated Methane (2.5 wt. %)

| | | | Initial Water Content of Solvent (wt. %) | | |
|---|---|---|---|---|---|
| | | | 1 | 5 | 10 |
| Ex | Solvent | Solvent Temp. °F. | Water Content of Dehydrated Methane (wt. %) | | |
| 1 | TEG | 86 | 0.3 | 0.8 | 1.0 |
| 2 | | 104 | 0.4 | 1.0 | 2.0 |
| 3 | 30% K Ac-DEG | 86 | 0.1 | 0.3 | 0.7 |
| 4 | | 104 | 0.1 | 0.6 | 1.0 |

It is clear from the data shown in Table III that air dehydration was significantly enhanced from a third to three times by the use of a composition comprising diethylene glycol and a salt selected from the group consisting of potassium acetate and potassium formate, over the industrial standard triethylene glycol. Similarly, significantly improved results are shown in Table IV for the dehydration of methane using a composition comprising diethylene glycol and potassium acetate over triethylene glycol alone. As can be seen, there is a 50% or greater improvement in the dehydration of methane using the diethylene glycol/potassium acetate solution compared to the industrial standard triethylene glycol.

Table V provides data showing the superiority of a substantially anhydrous composition for dehydration of a gaseous fluid in accordance with the process of this invention comprising triethylene glycol and dissolved potassium formate as compared to pure triethylene glycol alone.

TABLE V

Dehydration of Saturated Air (21° C.) with TEG-Potassium Formate Solution using Sintered Glass Cylinder Gas Dispersion Saturation of air with H₂O at 21° C.: theo., 1.57 wt. %
actual, 1.56 wt. %

| Solvent | t(°F.) | Water Content of Solvent (wt. %) | | | | |
|---|---|---|---|---|---|---|
| | | 0 | 1 | 3 | 5 | 10 | 15 |
| | | | Water Content of Treated Air (wt. %) | | | | |
| 20% KOOCH | 86 | 0 | 0.1 | 0.3 | 0.6 | 0.8 | 0.9 |
| in TEG | 104 | 0 | 0.2 | 0.4 | 0.7 | 0.9 | 1.2 |
| | 122 | 0 | 0.3 | 0.6 | 0.8 | 1.0 | 1.3 |
| | 140 | — | — | — | — | — | — |
| NEAT TEG | 86 | 0 | 0.3 | 0.4 | 0.65 | 0.85 | 1.0 |
| | 104 | 0 | 0.3 | 0.8 | 1.0 | 1.5 | — |
| | 122 | 0 | 0.4 | 1.0 | 1.4 | 1.5 | — |
| | 140 | 0.17 | — | — | — | — | — |

In virtually every instance, the amount of water remaining in the treated gaseous fluid after treatment with the anhydrous dehydration composition utilized in accordance with the process of this invention is in most cases substantially less than the water content of air treated with pure triethylene glycol alone.

U.S. Pat. No. 1,866,560 to Gordon et al. teaches the use of a solvent comprising 41.6% by weight calcium chloride, 38.4% by weight water, and 20.0% by weight glycerin for dehydrating methane. For comparison purposes, respective percentages of water shown were added, notwithstanding the large amount of initial water required by the Gordon solvent, with the result shown in Table VI.

TABLE VI

| | | Solvent | Water Content Added to Solvent (wt. %) | |
|---|---|---|---|---|
| | | | 1 | 5 |
| Ex | Solvent | Temp. °F. | Water Content Dehydrated Methane (wt. %) | |
| 1 | Gordon Solvent | 86 | 1.4 | 1.6 |
| 2 | | 104 | 2.1 | 2.3 |

It is clear from a comparison between the data shown in Table VI for a Gordon type solvent and the data shown in Tables I–V for a glycol/potassium carboxylate composition in accordance with the process of this invention that the process of this invention is substantially more effective in dehydrating methane than the Gordon type solvents.

Although potassium acetate, potassium formate and mixtures thereof enhance the ability of ethylene glycol, diethylene glycol, and triethylene glycol to dehydrate gases, the preferred solvent in accordance with the process of this invention is triethylene glycol. As previously indicated, triethylene glycol has good stability under the conditions of regeneration and superior ability, particularly in combination with potassium formate, within designated ranges, to remove water from gases. In addition, its use can reduce the expensive dehydration by 75% or more over known solvents.

For initial introduction into a counter-current system used in accordance with the process of this invention, the triethylene glycol solvent is substantially anhydrous. In accordance with a particularly preferred embodiment, the preferred anhydrous solvent composition comprises in the range of about 15 to 20 weight percent of potassium formate, for maximum efficiency. In addition, it is important that the process be controlled so that the water content of the effluent does not exceed about 15% by weight of water, thereby establishing an overall water range within the system of between about 0 and 15% by weight. When water is present in amounts above about 15% by weight, the ability of the substantially anhydrous composition to dehydrate starts to diminish rapidly.

Also as previously stated, the use of potassium acetate or potassium formate in combination with a glycol in accordance with the process of this invention, reduces the absorption of the aromatics, including benzene, toluene, ethylbenzene and xylene, which occur in natural gas. For example, benzene is soluble in triethylene glycol in all proportions and in diethylene glycol in the amount of about 31% by weight. In the presence of 30% by weight of potassium acetate in diethylene glycol, the solubility of benzene is reduced to approximately 14%, and with the addition of 5% by weight of water to a diethylene glycol/potassium acetate solvent, the solubility of benzene is reduced to about 10% or less. As the solvent composition approaches 15% by weight of water, the solubility of aromatics is reduced to approximately 2%. The rate of absorption is, of course, reduced proportionally. Accordingly, regeneration of the solvent composition in the absence of aromatics is substantially improved and, correspondingly, environmental problems associated with the limitation and disposing of aromatics during the generation process are eliminated.

Diphenylmethane (DPM) and 1,1-diphenylethane (DPE) alone or in conjunction with potassium carboxylates are taught by our recently issued U.S. Pat. No. 5,462,584 as lowering the solubility of aromatics in glycols such as triethylene glycol and, thus, decrease the rate of absorption of aromatics from gas streams treated with these glycols. However, diphenylmethane, for example, tends to be stripped from the water-laden triethylene glycol solution during triethylene glycol regeneration. Because triethylene glycol is used in a closed loop and, thus, must be regenerated by distillation, the use of diphenylmethane as an additive would require additional equipment for recovery and reuse.

We have discovered neutral organic additives which are not stripped from the solution during distillation to remove water from the glycol solution and which, when used in combination with potassium carboxylates, exhibit a synergistic effect in reducing the solubility of aromatics in glycols and, thus, reduce the absorption of aromatics by said glycol solutions. In particular, we have discovered that neutral organic additives, such as biphenylphenyl ether and MARLOTHERM-S, a commercially available heat transfer fluid (dibenzyltoluene), when dissolved in a substantially anhydrous composition comprising a glycol selected

TABLE VII

DEPRESSION OF BENZENE SOLUBILITY IN TRIETHYLENE GLYCOL (TEG)
t, 21° C.

| Additive | m. (°C.) | Additive Solubility TEG wt. % | Additive Solubility TEG +5% H$_2$O wt. % | Bz solubility in Additive Soln. TEG wt. % | Bz solubility in Additive Soln. TEG +5% H$_2$O wt. % |
|---|---|---|---|---|---|
| Diphenylmethane | 26 | 22.0 | 11.0 | 4.8 | 2.1 |
| 1,1-Diphenylethane | −21 | 15.0 | 7.0 | 9.1 | 4.9 |
| Phenyl ether | 26 | 35.0 | 16.4 | 7.9 | 2.1 |
| 1,2-Diphenylethane | 52 | 6.0 | — | 52.7 | — |
| 1,3-Diphenoxybenzene | 60 | 3.5 | — | ∞ | — |
| Biphenyl | 70 | 5.9 | — | ∞ | — |
| o-Terphenyl | 58 | 5.2 | — | 49.1 | — |
| Fluorene | 115 | 2.8 | — | ∞ | — |

TABLE VII-continued
DEPRESSION OF BENZENE SOLUBILITY IN TRIETHYLENE GLYCOL (TEG)
t, 21° C.
| Additive | m. (°C.) | Additive Solubility | | Bz solubility in Additive Soln. | |
|---|---|---|---|---|---|
| | | TEG wt. % | TEG +5% $H_2O$ wt. % | TEG wt. % | TEG +5% $H_2O$ wt. % |
| 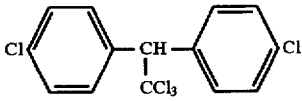 DDT | 110 | 3.2 | — | ∞ | — |
| 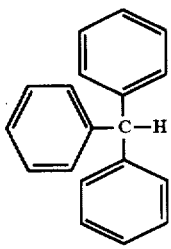 Triphenylmethane | 93 | 2.3 | — | 22.1* (Toluene) | — |
| 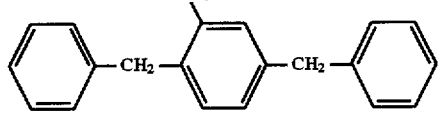 *MARLOTHERM "L"; | 280 | 10.7 | 5.6 | 11.9 | 6.4 |
| 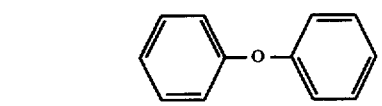 **MARLOTHERM "S"; | 390 | 4.8 | 2.2 | 35.2 | 11.5 |
| 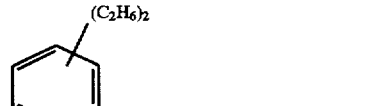 ***DOWTHERM "G"; | 288 | 23.6 | 10.6 | 12.3 | 4.6 |
| 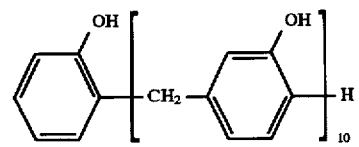 ****DOWTHERM "J"; | 181 | 5.7 | 3.3 | 22.3 | 11.8 |
|  Novolak | — | 30. | 30.0 | 25. | 17.3 |

TABLE VII-continued

DEPRESSION OF BENZENE SOLUBILITY IN TRIETHYLENE GLYCOL (TEG)
t, 21° C.

| | | Additive Solubility | | Bz solubility in Additive Soln. | |
|---|---|---|---|---|---|
| Additive | m. (°C.) | TEG wt. % | TEG +5% $H_2O$ wt. % | TEG wt. % | TEG +5% $H_2O$ wt. % |
| 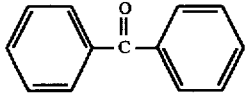 Benzophenone | 49°/305° | 23.7 | — | ∞ | — |

*Triphenylmethane co-crystalizes with benzene
*MARLOTHERM "L" - benzyltoluene isomeric mixture available from Hüls America Inc.
**MARLOTHERM "S" - dibenzyltoluene isomeric mixture available from Hüls America Inc.
***DOWTHERM "G" - commercial mixture of biphenyl phenyl ethers, biphenyl ether, polyphenyl ethers, and diphenylphenol available from Dow Chemical Co.
****DOWTHERM "J" - alkylated benzene.

TABLE VIII

ADDITIVE EFFECT
BENZENE SOLUBILITY DEPRESSION IN TEG; t, 20° C.

| | | Additive Solubility | | | | Bz Solubility in Additive Soln. | | | |
|---|---|---|---|---|---|---|---|---|---|
| Name | Formula | TEG w. % | TEG 5% $H_2O$ w. % | TEG-20 5% $H_2O$ w. % | TEG-20 10% $H_2O$ w. % | TEG w. % | TEG 5% $H_2O$ w. % | TEG-20 5% $H_2O$ w. % | TEG-20 10% $H_2O$ w. % |
| Sol'n "A" | SEE TEXT | 19.5 | 9.5 | 3.7 | 1.7 | 6.3 | 1.7 | 0.9 | 0.9 |
| Diphenyl-Methane (DPM) | 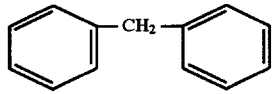 | 22. | 11. | 4.5 | 2.5 | 4.7 | 2.1 | 1.7 | 0.9 |
| Diphenyl-Ether (DPE) | 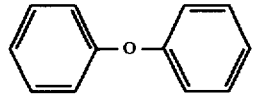 | 35. | 16.4 | 6.7 | 3.4 | 7.9 | 2.1 | 1.8 | 1.8 |
| DOWTHERM G | 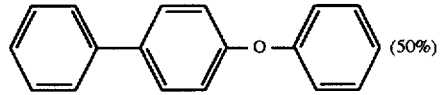 (50%) 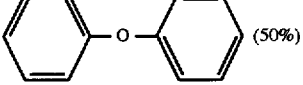 (50%) | 23.6 | 10.6 | — | — | 12.3 | 4.6 | — | — |
| 2-Phenoxy-Biphenyl | 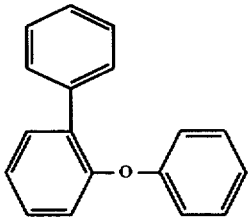 | — | 3.2 | — | — | — | 20.5 | — | — |

TABLE VIII-continued

ADDITIVE EFFECT
BENZENE SOLUBILITY DEPRESSION IN TEG; t, 20° C.

| Additive | | | Additive Solubility | | | Bz Solubility in Additive Soln. | | |
|---|---|---|---|---|---|---|---|---|
| Name / Formula | TEG w. % | TEG 5% $H_2O$ w. % | TEG-20 5% $H_2O$ w. % | TEG-20 10% $H_2O$ w. % | TEG w. % | TEG 5% $H_2O$ w. % | TEG-20 5% $H_2O$ w. % | TEG-20 10% $H_2O$ w. % |
| MARLOTHERM-SH (MTSH) (structure: $CH_2$–phenyl–$CH_2$–phenyl–$CH_2$–phenyl) | — | 3.1 | 1.1 | 0.45 | — | 4.5 | 2.2 | 1.8 |

TEG-20: Triethylene glycol, 20 w. % potassium formate from the group consisting of ethylene glycol, diethylene glycol, triethylene glycol and mixtures thereof, and a dissolved salt comprising at least one potassium carboxylate results in a reduction of the solubility of aromatics, such as benzene, substantially greater than one would expect based upon the reduction in solubilities resulting from glycol solutions containing either a potassium carboxylate or one of these neutral organic additives.

Tables VII and VIII show the depression of benzene solubility in triethylene glycol by various neutral organic additives. A positive additive effect is defined as any reduction in benzene solubility over that observed without the additive. Diphenylmethane, 1,1-diphenylethane, and phenyl ether, while effective as aromatic solubility depressants, are generally not suitable due to their relatively high volatility. By comparison, the high molecular weight products, MARTHOLTHERM-S, DOWTHERM "G", and Novolak are all seen as being effective additives. MARLOTHERM-S, having a boiling point of 390° C., resists stripping during distillation of water from the triethylene glycol solution and is also a neutral hydrocarbon. Study of MARLOTHERM-S has also led to the discovery of a synergistic effect, particularly when used with potassium formate.

We have found that a solution (Solution "A") comprising by weight in the range of about 0–40% diphenyl ether, 5–65% biphenylphenyl ether and 0–35% polyphenylphenols is non-volatile with water at 100° C., has a good solubility, even in the presence of water, and gives good results, even without salts. Table IX shows the solubility depression of benzene, toluene, and xylene in triethylene glycol with potassium formate and Solution "A". It can be seen that Solution "A" is most effective at a level of about 15% by weight water.

TABLE IX

Additive Evaluation
BTEX Solubility Depression in TEG*
Potassium Formate (KOOCH) and Sol'n "A"
t.21° C.

| TEG SOLN | KOOCH w. % | $H_2O$ w. % | Sol'n "A" w. % | B w. % | T w. % | X w. % |
|---|---|---|---|---|---|---|
| 0[1] | — | — | — | ∞ | 25 | 15.1 |
| 0 | — | 5 | — | 23.6 | 14.8 | 8 |
| 0 | — | 10 | — | 16.7 | 9.2 | 5.5 |
| 0 | — | 15 | — | 10.3 | 6.7 | 4.5 |
| 0 | — | — | 19.5 | 6.3 | 2.7 | 1.4 |
| 0 | — | 5 | 9.5 | 1.7 | 0.7 | 0.4 |

TABLE IX-continued

Additive Evaluation
BTEX Solubility Depression in TEG*
Potassium Formate (KOOCH) and Sol'n "A"
t.21° C.

| TEG SOLN | KOOCH w. % | $H_2O$ w. % | Sol'n "A" w. % | B w. % | T w. % | X w. % |
|---|---|---|---|---|---|---|
| 0 | — | — | — | — | — | — |
| 20[2] | 18.3 | — | 8.5 | 1.6 | 0.6 | 0.2 |
| 20 | 18.3 | 5 | 3.7 | 0.9 | 0.5 | 0.14 |
| 20 | 17.7 | 10 | 1.7 | 0.9 | 0.2 | 0.2 |
| 20 | 16.9 | 15 | 0.7 | 0.6 | 0.5 | 0.4 |

*Solubility of each component in the absence of the others
[1]TEG-0: neat TEG
[2]TEG-20: 20 w. % KOCH in TEG Table X shows the depression of benzene solubility in triethylene glycol with potassium formate and MARTHLOTHERM-S under varying conditions. Lines 1–3 show the effect with no additives; lines 4–9 show the effect of MARLOTHERM-S alone; lines 10–13 show the effect of potassium formate at 20.0 wt. percent; and lines 14–17 show the effect of potassium formate and MARLOTHERM-S in combination. It is clear from the data in lines 14–17 that the combination of additives produces a result substantially greater than the additive effect of the individual components.

TABLE X

Depression of Benzene Solubility in Triethylene Glycol 21° C.
with potassium Formate (KOOCH) and MARLOTHERM-S (MTS)

| | TEG SOLN | KOOCH (w. %) | $H_2O$ (w. %) | MTS (w. %) | Bz. Sol (w. %) |
|---|---|---|---|---|---|
| 1. | 0 | — | — | — | ∞ |
| 2. | 0 | — | 2 | — | 36.7 |
| 3. | 0 | — | 5 | — | 23.6 |
| 4. | 0 | — | — | 5.3* | 30 |
| 5. | 0 | — | 2 | 2.3 | 29.9 |
| 6. | 0 | — | 2 | 3.5 | 20.4 |
| 7. | 0 | — | 2 | 3.7* | 14.1 |
| 8. | 0 | — | 5 | 2.2* | 11 |
| 9. | 0 | — | 2 | 2.2 | 29.9 |
| 10. | 20 | 20 | — | — | 20 |
| 11. | 20 | 20 | 2 | — | 16 |
| 12. | 20 | 20 | 5 | — | 12.3 |
| 13. | 20 | 20 | 10 | — | 8.2 |
| 14. | 20 | 19.6 | — | 2.* | 1.5 |
| 15. | 20 | 19.3 | 2 | 1.2* | 1.1 |

TABLE X-continued

Depression of Benzene Solubility in Triethylene Glycol 21° C. with potassium Formate (KOOCH) and MARLOTHERM-S (MTS)

| | TEG SOLN | KOOCH (w. %) | H$_2$O (w. %) | MTS (w. %) | Bz. Sol (w. %) |
|---|---|---|---|---|---|
| 16. | 20 | 18.8 | 5 | 0.8* | 2.2 |
| 17. | 20 | 17.9 | 10 | 0.36* | 4.2 |
| 18. | 20 | 9.7 | — | 2.5* | 11.5 |
| 19. | 20 | 9.6 | 2 | 1.75* | 1.8 |
| 20. | 20 | 9.4 | 5 | 1.* | 2 |
| 21. | 7.5 | 7.3 | — | 2.8* | 11.5 |
| 22. | 7.5 | 7.2 | 1 | 2.4* | 8.9 |
| 23. | 7.5 | 7.2 | 2 | 2.* | 8.3 |
| 24. | 7.5 | 7 | 5 | 1.2* | 4.5 |
| 25. | 5 | 4.8 | — | 3.1* | 16.1 |
| 26. | 5 | 4.8 | — | 2.2* | 8.4 |
| 27. | 5 | 4.7 | 5 | 1.4* | 4.5 |

*Saturated Solution
[1]TEG-0: neat TEG
[2]TEG-20: 20 w. % KOOCH in TEG

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for dehydrating a gaseous fluid comprising: contacting said gaseous fluid with a dehydrating composition comprising a glycol selected from the group consisting of ethylene glycol, diethylene glycol, triethylene glycol, and mixtures thereof, and an aromatic solubility depressant selected from the group consisting of phenyl ether, 1,2-diphenylethane, o-terphenyl, triphenylmethane, a benzyltoluene isomeric mixture, a dibenzyltoluene isomeric mixture, a mixture of biphenyl phenyl ethers, biphenyl ether, polyphenyl ethers, and diphenylphenol, alkylated benzene, novolak, 2-phenoxybiphenyl, and a solution comprising by weight about 0–40% diphenylether, about 5–65% biphenylphenylether and about 0–35% polyphenylphenols.

2. A process in accordance with claim 1, wherein said aromatic solubility depressant is one of phenyl ether, a dibenzyltoluene isomeric mixture, a mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

3. A process in accordance with claim 2, wherein said aromatic solubility depressant is one of said mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

4. A process in accordance with claim 1, wherein said glycol is triethylene glycol.

5. A process in accordance with claim 2, wherein said glycol is triethylene glycol.

6. A process in accordance with claim 3, wherein said glycol is triethylene glycol.

7. A process in accordance with claim 1, wherein said dehydrating composition comprises a dissolved salt comprising at least one potassium carboxylate.

8. A process in accordance with claim 7, wherein said potassium carboxylate is selected from the group consisting of potassium acetate and potassium formate.

9. A process in accordance with claim 7, wherein said dissolved salt comprises in the range of about 10% to 21% by weight of said dehydrating composition.

10. A process in accordance with claim 7, wherein said aromatic solubility depressant is one of phenyl ether, a dibenzyltoluene isomeric mixture, a mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

11. A process in accordance with claim 10, wherein said aromatic solubility depressant is one of a mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

12. A process in accordance with claim 11, wherein said glycol is triethylene glycol and said potassium carboxylate is selected from the group consisting of potassium acetate and potassium formate.

13. A process in accordance with claim 1, wherein said gaseous fluid is natural gas.

14. A process in accordance with claim 7, wherein said gaseous fluid is natural gas.

15. A process for dehydrating a gaseous fluid comprising contacting said gaseous fluid in a continuous counter current contact zone with a dehydrating composition comprising a glycol selected from the group consisting of triethylene glycol, ethylene glycol, diethylene glycol, and mixtures thereof, and an aromatic solubility depressant selected from the group consisting of phenyl ether, 1,2-diphenylethane, o-terphenyl, triphenylmethane, a benzyltoluene isomeric mixture, a dibenzyltoluene isomeric mixture, a mixture of biphenyl phenyl ethers, biphenyl ether, polyphenyl ethers, and diphenylphenol, alkylated benzene, novolak, 2-phenoxybiphenyl, and a solution comprising by weight about 0–40% diphenylether, about 5–65% biphenylphenylether and about 0–35% polyphenylphenols.

16. A process in accordance with claim 15, wherein said gaseous fluid is natural gas.

17. A process in accordance with claim 15, wherein said aromatic solubility depressant is one of phenyl ether, a dibenzyltoluene isomeric mixture, a mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

18. A process in accordance with claim 17, wherein said aromatic solubility depressant is one of said mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

19. A process in accordance with claim 15, wherein said dehydrating composition comprises a dissolved salt comprising at least one potassium carboxylate.

20. A process in accordance with claim 19, wherein said potassium carboxylate is selected from the group consisting of potassium acetate and potassium formate.

21. A process in accordance with claim 20, wherein said glycol is triethylene glycol and said aromatic solubility depressant is one of said mixture of biphenyl phenyl ethers, biphenyl ether, polyphenyl ethers, and diphenylphenol, 2-phenoxybiphenyl, and said solution comprising by weight about 0–40% diphenylether, about 5–65% biphenylphenylether and about 0–35% polyphenylphenols.

22. A process in accordance with claim 21, wherein said gaseous fluid is natural gas.

* * * * *